US006728593B2

(12) United States Patent
Hu et al.

(10) Patent No.: US 6,728,593 B2
(45) Date of Patent: Apr. 27, 2004

(54) SYSTEM FOR ANALYSIS OF FABRIC SURFACE

(75) Inventors: Jinlian Hu, Hung Hom (HK); Binjie Xin, Hung Hom (HK); Yueyang Guo, Hung Hom (HK); Edward Newton, Hung Hom (HK)

(73) Assignee: The Hong Kong Polytechnic University, Hung Hom (HK)

( * ) Notice: Subject to any disclaimer, the term of this patent is extended or adjusted under 35 U.S.C. 154(b) by 111 days.

(21) Appl. No.: 10/162,696

(22) Filed: Jun. 6, 2002

(65) Prior Publication Data
US 2003/0229413 A1 Dec. 11, 2003

(51) Int. Cl.[7] .............................................. G01B 11/30
(52) U.S. Cl. ........................ 700/143; 356/431; 356/613
(58) Field of Search ................................ 700/130, 143; 356/429, 430, 431, 238.1, 601, 613; 348/88

(56) References Cited

U.S. PATENT DOCUMENTS

| | | |
|---|---|---|
| 4,449,818 A | 5/1984 | Yamaguchi et al. |
| 4,791,481 A * | 12/1988 | Verdiere et al. ............... 348/88 |
| 5,016,173 A | 5/1991 | Kenet et al. |
| 5,125,034 A | 6/1992 | Hudson et al. |
| 5,815,198 A | 9/1998 | Vachtsevanos et al. |
| 5,852,671 A | 12/1998 | Oshima |
| 5,852,672 A | 12/1998 | Lu |
| 5,936,665 A | 8/1999 | Vachtsevanos et al. |
| 5,943,164 A | 8/1999 | Rao |
| 5,946,424 A | 8/1999 | Oshima |
| 5,960,118 A | 9/1999 | Briskin et al. |
| 5,974,168 A | 10/1999 | Rushmeier et al. |
| 6,010,861 A | 1/2000 | Blume |
| 6,167,151 A | 12/2000 | Albeck et al. |
| 6,252,623 B1 | 6/2001 | Lu et al. |
| 6,542,249 B1 * | 4/2003 | Kofman et al. ............. 356/601 |

* cited by examiner

Primary Examiner—Peter Nerbun
(74) Attorney, Agent, or Firm—Leydig, Voit & Mayer, Ltd.

(57) ABSTRACT

A system for analyzing fabric surface appearance includes a feed mechanism for running a fabric over a crest including a frame for holding the fabric bent to form a crest, an image capturing device for capturing profile images of the fabric surface at the crest, and a computer system for manipulating the images. The computer system produces a three-dimensional representation of the fabric surface and identifies characteristics in the three-dimensional representation. The information is compared to reference data to identify a grade for the fabric.

10 Claims, 3 Drawing Sheets

SYSTEM FOR ANALYSIS OF FABRIC SURFACE

BACKGROUND TO THE INVENTION

1. Field of the Invention

The invention relates to a system for the analysis of fabric surface appearance, and in particular to a method and apparatus for constructing a three-dimensional image of a fabric surface.

2. Background Information

When assessing the grade of fabric it is desirable to use objective evaluation criteria so that interested parties can be confident in the represented grading. Recent progress in this area has been directed towards developing automated analysis techniques which are effective in identifying surface characteristics, such as pilling, of fabric. Such automated techniques can provide a standard, objective, evaluation of fabric grade.

Current automated techniques include acquiring surface images from a fabric specimen using a Charge-Coupled Device (CCD) camera with a suitable lighting source. The camera produces an image of the fabric surface which is manipulated to identify the different reflex intensity (gray) areas created by pilling and background features. A suitable grey threshold is applied to identify pilling on the fabric surface. Such a technique suffers from the disadvantage of the reflectance not being consistent across patterned, colorful or multicolored fabrics. The reflex intensity of the pilled areas appears different in different color areas of the fabric. Thus, on patterned fabric this technique cannot consistently identify fabric surface characteristics.

To avoid the above problem a laser triangulation technique can be used. In this technique the fabric is placed on an X-Y translation table and the high spots on the fabric surface measured one by one with a laser sensor. However, data capture using this technique is considerably slower than with the CCD camera, and because the technique relies on reflection of a laser beam the technique has limitations of use with dark fabrics.

SUMMARY OF THE INVENTION

It is an object of the present invention to provide a system for the analysis of fabric surface appearance that is unaffected by the color or pattern of a fabric.

It is a further object of the present invention to provide a system for the analysis of fabric surface appearance that ameliorates the above-mentioned disadvantages or at least provides the public with a useful alternative.

According to a first aspect of the invention there is provided a system for analyzing fabric surface appearance including a feed mechanism for running a fabric over a crest, an image capturing device operable to capture a plurality of profile images of the fabric surface at the crest, and a computer system in communication with the image capture device and operable to manipulate the images to produce a three-dimensional representation of the fabric surface.

Preferably, The feed mechanism includes a frame for holding the fabric bent to form a crest, and a drive mechanism for moving the frame in a manner that moves the crest in the fabric from one end of the fabric to the other. The frame may be an A-frame, Alternatively, the frame may include at least two rollers, an endless belt disposed between the two rollers, and a drive motor for rotating at least one of the rollers, and wherein the belt has fasteners for removably securing the fabric to it.

Preferably, the image capturing device is a Charge-Coupled Device camera.

According to a second aspect of the invention there is provided a method of analyzing fabric surface appearance including the steps of: capturing a series of profile images of the surface of a fabric and manipulating the images to produce a three-dimensional representation of the fabric surface, identifying prominent characteristics in the three-dimensional representation, and comparing the identified prominent characteristics to reference data to identify a grade for the fabric.

Preferably, the images to produce a three-dimensional representation of the fabric surface includes: applying a threshold to each image to identify the profile edge line of the fabric surface, resolving the profile edge line into data points, and combing the data points from the series of images to produce a three-dimensional map.

Preferably, identifying prominent characteristics in the three-dimensional representation includes: filtering the three-dimensional map, and identifying portions of the three-dimensional map with characteristics above a predetermined height.

Preferably, the reference data includes height, area and distribution density of the prominent characteristics.

According to a third aspect of the invention there is provided a system for analyzing fabric surface appearance including: a feed mechanism for running a fabric over a crest including, a frame for holding the fabric bent to form a crest, and a drive mechanism for moving the frame in a manner that moves the crest in the fabric from one end of the fabric to the other, an image capturing device operable to capture a plurality of profile images of the fabric surface at the crest, and a computer system in communication with the image capture device and operable to manipulate the images to produce a three-dimensional representation of the fabric surface, to identify prominent characteristics in the three-dimensional representation, and to compare the identified prominent characteristics to reference data to identify a grade for the fabric.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
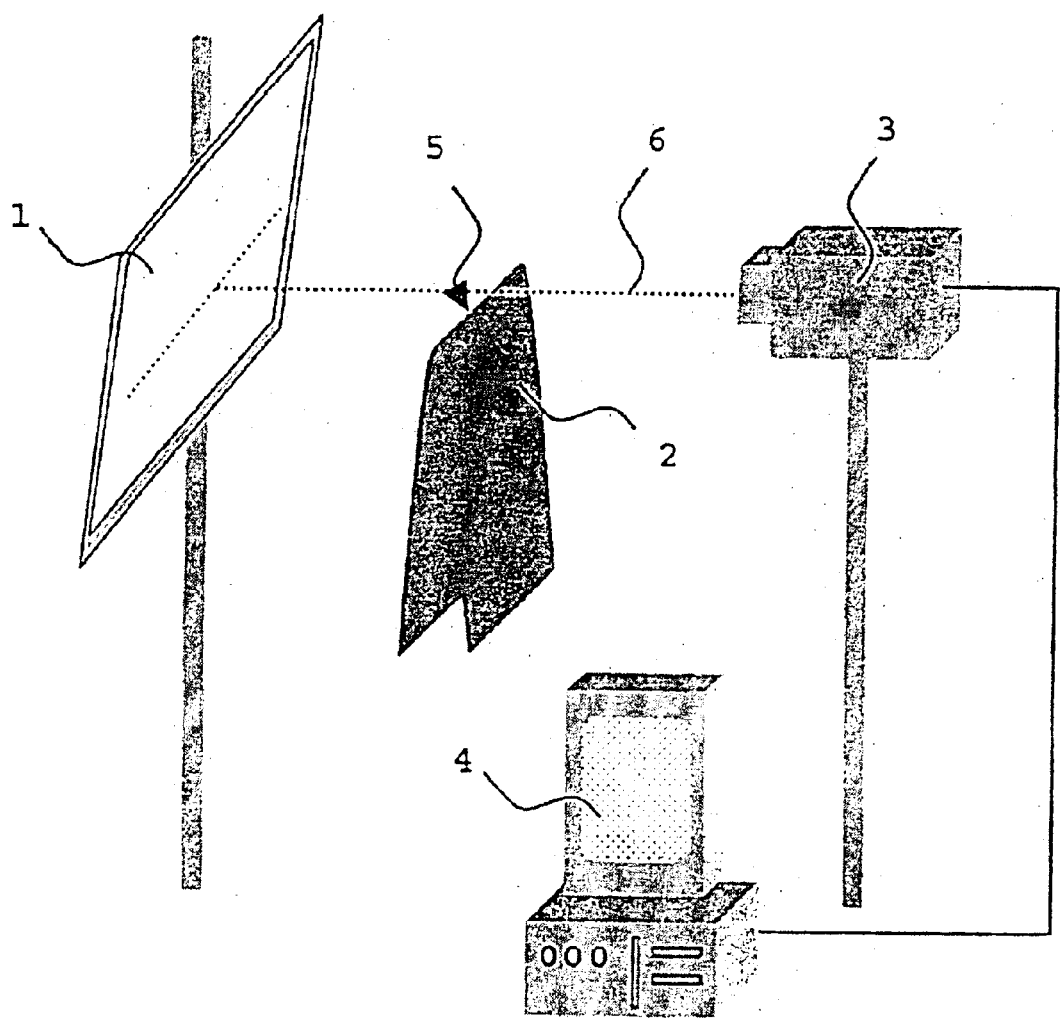
FIG. 1 illustrates a set of apparatus according to the invention.

FIG. 1 illustrates a schematic of a preferred apparatus set-up of the invention. A CCD camera 3 faces a white background 1. In the preferred embodiment the white background 1 is a light box. For reference the center of the image captured by the CCD camera 3 falls on a path marked by the dashed line 6.

Disposed between the camera 3 and background 1 is a fabric sample 2 bent to a substantially "A" shape to provide an upper crest 5 which lies on line 6 in the center of the image captured by CCD camera 3.

A computer system 4 is in communication to receive the captured images from CCD camera 3. The computer system 4 manipulates and analyses the images captured by the CCD camera 3. This is described in detail later in this description.

According to the above arrangement the CCD camera 3 captures a profile image of the fabric surface at crest 5. Illuminated background 1 provides a contrast to fabric 2 to aid computer manipulation of the image. Fabric 2 is disposed on a frame mechanism (not shown in FIG. 1) operable to run the fabric 2 over crest 5. CCD camera 3 is interlocked with a drive means of the frame mechanism to capture a profile image from for a plurality of fabric 2 profiles as they pass over crest 5.

Figure 3:
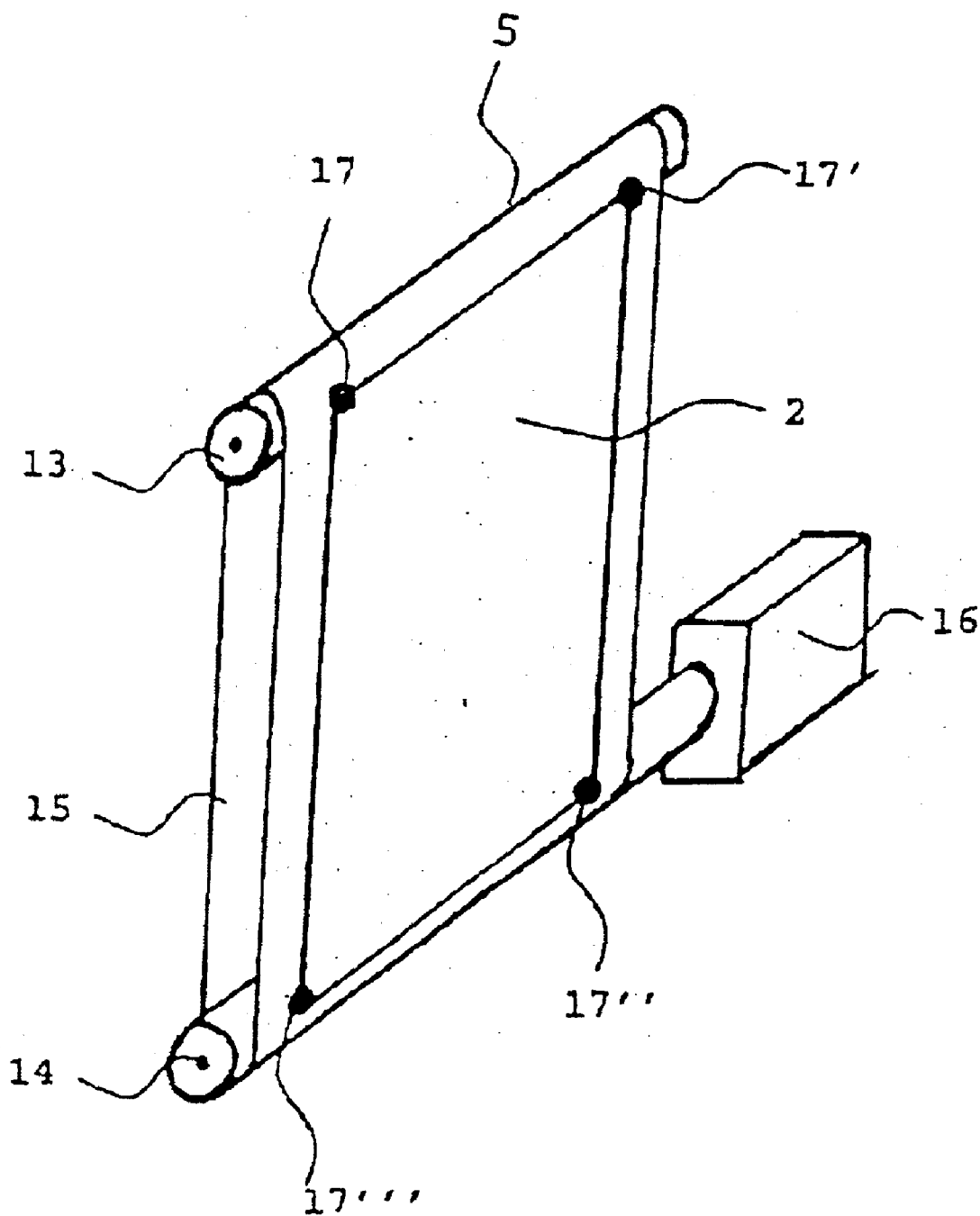
FIG. 3 illustrates an embodiment of a feed mechanism for running a fabric over a crest.

FIG. 3 illustrates an embodiment of the frame mechanism. First and second rollers 13, 14 are rotatably disposed one above the other. An endless belt 15 is disposed about the rollers 13,14. A drive means 16, preferably a stepper motor, is engaged to rotate roller 14 and thus endless belt 15. A plurality of fasteners 17 are provided to secure fabric sample 2 to endless belt 15. Operation of stepper motor 16 runs endless belt 15 and fabric 2 over upper roller 13, the upper portion of which forms crest 5.

Figure 2:
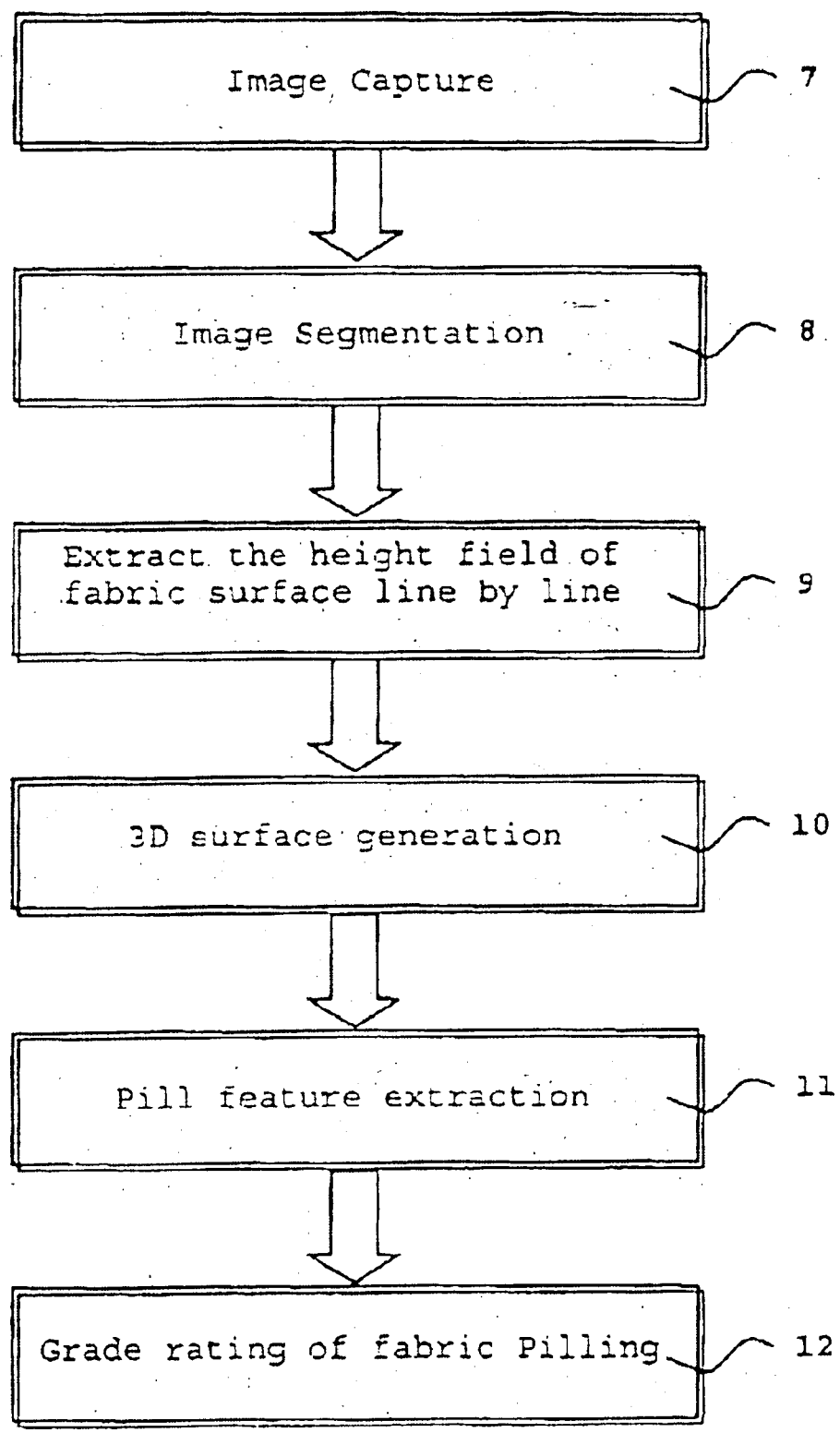
FIG. 2 illustrates steps for analyzing fabric surface appearance according to the invention.

FIG. 2 illustrates process steps in the preferred embodiment of a method for analyzing the fabric surface. The first step is image capture 7. The CCD camera 3 captures a profile image for each of a plurality of portions of the fabric 2 surface as it passes over crest 5. The images are recorded by computer system 4.

The second step is image segmentation 8. The edge line of the fabric from each profile image is obtained. This is done by applying a histogram analysis and selecting a suitable threshold at which to segment the profile image. There are two approximate normal distributions $(u_1,\sigma_1)$, $(u_2,\sigma_2)$ in the image histogram. One is the gray distribution of the shadow region of the fabric 2, and the other is the no shadow region of the illuminated background 1. The threshold can be defined according to the equation $$t = \frac{u_1 + u_2 + 3\sigma_1 - 3\sigma_2}{2}$$

The third step 9 is to extract the height profile of the fabric surface line by line. This is done by calculating the position $(x_i,y_i)$ for each point i along the profile of is the gray image, where $x_i$, is the horizontal coordinate of each point i and $y_i$ is the height coordinate of each point i. Thus, x,y data is obtained for the fabric profile at a plurality of positions along the fabric length.

The fourth step 10 is to generate a three-dimensional representation of the fabric surface. This is done by combining all x,y surface data from the profile images obtained to produce a three dimensional surface map. Since the fabric sample is running passed the crest 5 the step size between two successive profile images is a constant s which can be can calculated from the stepper motor 16 speed. The two-dimensional coordinates system (x,y) of the profile images is mapped to a three dimensional coordinate system (x,y,z) based of the movement of the fabric sample running past crest 5. The Z coordinate is obtained from the distance of travel of the fabric sample between images. The first image captured by the CCD camera 3 is at point z=0 and the next z coordinates are s, 2s, 3s and so on. The three-dimensional surface map of the fabric sample is produced by this sequence of three-dimensional (x,y,z) data.

Once the three-dimensional representation has been obtained the next step, 11, is to extract surface characteristics, such as pill features, from the three dimensional data. This is done by applying Gaussian filter to reduce noise and enhance the characteristic features of the three dimensional surface image. The three-dimensional surface image is then segmented into two separate portions, a characteristic portion and a background portion, based on height. The characteristic features are contained in the first, characteristic, portion. These might be all portions of the three dimensional image having height values $(y_i)$ above a value which is determined from the basic fabric weight. These features are analyzed to determine such factors as their number, height, density and size. Typically the characteristic being analyzed are fabric pills.

The final step 12 is to compare the extracted characteristic features to reference data to identify a grade for the fabric.

By use of profile images from a fabric sample the invention is immune to fabric characteristics such as color and pattern.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claim is:

1. A system for analyzing fabric surface appearance including:
    a feed mechanism for running a fabric over a crest,
    an image capturing device for capturing a plurality of profile images of the fabric surface at the crest, and
    a computer system in communication with the image capture device for manipulating the images to produce a three-dimensional representation of the fabric surface.

2. The system for analyzing fabric surface appearance as claimed in claim 1 wherein the feed mechanism includes a frame for holding the fabric bent to form a crest, and a drive mechanism for moving the frame so the crest in the fabric moves from a first end of the fabric to a second end of the fabric.

3. The system for analyzing fabric surface appearance as claimed in claim 2 wherein the frame has an A-shape in cross-section.

4. The system for analyzing fabric surface appearance as claimed in claim 2 wherein the frame includes at least two rollers, an endless belt disposed between the two rollers, and a (drive motor or rotating at least one of the rollers, wherein the belt has fasteners for removably securing the fabric to the belt.

5. The system for analyzing fabric surface appearance as claimed in claim 1 wherein the image capturing device is a Charge-Coupled Device camera.

6. A method of analyzing fabric surface appearance including:
    capturing a series of profile images of a surface of a fabric and manipulating the images to produce a three-dimensional representation of the fabric surface,
    identifying characteristics in the three-dimensional representation, and
    comparing the identified characteristics to reference data to identify a grade for the fabric.

7. The method of analyzing fabric surface appearance as claimed in claim 6 wherein manipulating the images to produce a three-dimensional representation of the fabric surface includes:

applying a threshold to each image to identify a profile of the fabric surface, resolving the profile into data points, and combining the data points from the series of images to produce a three-dimensional map.

8. The method of analyzing fabric surface appearance as claimed in claim 6 wherein identifying characteristics in the three-dimensional representation includes:

filtering the three-dimensional map, and identifying portions of the three-dimensional map with characteristics exceeding a threshold.

9. The method of analyzing fabric surface appearance as claimed in claim 6 wherein the reference data includes height, area, and distribution density of the characteristics.

10. A system for analyzing fabric surface appearance including:

a feed mechanism for running a fabric over a crest including a frame for holding the fabric bent to form a crest, and a drive mechanism for moving the frame to move the crest in the fabric from a first end of the fabric to a second end of the fabric, an image capturing device for capturing a plurality of profile images of the fabric surface at the crest, and a computer system in communication with the image capture device for manipulating the images to produce a three-dimensional representation of the fabric surface, to identify characteristics in the three-dimensional representation, and to compare the identified characteristics to reference data to identify a grade for the fabric.

* * * * *